Patented Apr. 14, 1931

1,800,297

UNITED STATES PATENT OFFICE

DAVID L. JACOBSON, OF PITTSBURGH, PENNSYLVANIA, ASSIGNOR TO THE KOPPERS COMPANY, A CORPORATION OF DELAWARE

GAS PURIFICATION

No Drawing.    Application filed January 11, 1927.   Serial No. 160,528.

My invention relates to the purification of gas, such as fuel gas or other gas containing hydrogen sulphide or analogous acidic impurities by means of an alkaline solution circulated through a cycle comprising an absorption stage and an actification stage. My invention relates especially to processes of this nature employing alkaline solutions containing small amounts of certain metallic salts in suspension or solution, for the purpose of promoting the liberation of free sulphur during actification of the solutions.

An object of my invention is to provide a process of gas purification wherein side reactions are substantially eliminated.

A second object of my invention is to reduce the consumption of alkali in gas purification processes of the character described.

A further object of my invention is to increase the production of free sulphur in the actification of sulphides in alkaline solution or suspension.

In gas purification processes involving the use of simple alkaline solutions, for example, those covered by U. S. Patents Nos. 1,389,980 to C. J. Ramsburg and 1,390,037, to myself, hydrogen sulphide is absorbed from the gas as sodium hydrosulphide, according to the following reaction:

(1) 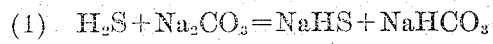

$H_2S + Na_2CO_3 = NaHS + NaHCO_3$

When the solution containing sodium hydrosulphide is subjected to aeration in the actification stage, the actifier air removes hydrogen sulphide from the system and causes a reversal of this reaction with consequent regeneration of the alkali.

More recent gas purification processes have been based on the use of alkaline solutions containing certain metallic compounds in solution or suspension.

The metallic compounds used for this purpose are compounds, such as the oxide, hydrate, or sulphide, of the essentially divalent elements in the eighth group of the periodic system, namely iron, nickel and cobalt. In such processes, the oxidation of sodium hydrosulphide is caused to result in the liberation of sulphur in elemental form. This sulphur is then separated from the liquid by flotation. The oxidation of the absorbed $H_2S$ may take place through sulphidation and oxidation of the metallic compound, as in the case of alkaline iron suspensions, or the oxidation may take place under the catalytic influence of the metallic compound, as in the case of alkaline solutions containing small amounts of nickel sulphide.

In all such processes of gas purification, whether based on the use of simple alkaline solutions or involving the utilization of suspensions or solutions of the class just described, a certain amount of alkali is consumed in irreversible side reactions, such as the formation of sodium thiosulphate. But it has been shown that metallic compounds that have utility in promoting the liberation of free sulphur exert an influence upon side reactions of the character indicated, resulting in greatly increased formation of thiosulphate as compared with the processes in which a simple alkaline solution is used, and it is toward the reduction of such secondary reactions in gas purification processes involving alkaline suspensions of metallic compounds, that my invention is directed.

I have discovered that the presence of a small amount of a lead compound in the alkaline liquid will retard the formation of sodium thiosulphate. Accordingly, I circulate an alkaline suspension of a metallic compound such as iron oxide and containing a lead compound over the flowing gas in suitable contact apparatus for absorption of impurities in the gas and through further apparatus wherein the suspension is subjected to aeration or the like for actification. Such aeration is preferably accomplished by means of finely comminuted air. The actified liquid may then be returned to contact with further amounts of gas.

With respect to the specific compound used for the production of sodium thiosulphate formation, I have found that a great number of lead compounds may be used. The lead may be present as base-forming element, as in lead acetate, or the lead may be present in the acid radical, as in sodium plumbite or sodium plumbate. The lead may be present in any of the various valences of that element and the lead compound may be soluble in water or insoluble in water. It is not necessary to use a pure lead compound to accomplish the purpose above recited but a crude lead compound, such as a lead ore, or a waste lead by-product may be used.

With regard to the amount of lead required to be present, I have found that very slight amounts of the lead compound will exert appreciable effects. The amounts are, in fact, so small that I am justified in believing the influence to be catalytic in character. To illustrate the use of the lead compounds and the nature of results accomplished, even when extremely small amounts are used, the following results are cited:

When a 3% solution of sodium carbonate containing 0.5% of $Fe_2O_3$ in suspension was subjected to the action of $H_2S$, 37.6% of the $H_2S$ absorbed was converted to sodium thiosulphate; whereas, in the presence of 0.3% of lead acetate, the amount of sodium thiosulphate formed was reduced to only 12.3% of the $H_2S$ absorbed. Analyses of the treated solutions showed that the hydrogen sulphide is not oxidized to any other further fixed salts, such as sodium sulphate.

I may add lead compound to a liquid purification system in any of a number of ways, as for example, (1) by direct addition to the system in operation, (2) by making a solution of a lead compound in water and adding it to the system, (3) adding such solution to a solution of alkali and adding the resultant solution to the system, (4) by grinding the metallic compound to be used in the gas purification system in the presence of an aqueous solution of lead compound, or (5) by grinding the mixture of iron oxide or equivalent metallic element and a solid lead compound and subsequently adding the mixture to the gas purification system. The alkalinity of my liquid is preferably from 1 to 3%, with iron compound or the like, in amount up to 2% in suspension therein.

The process of my invention provides for the reduction of the formation of sodium thiosulphate as a product of side reaction in the purification of gas with alkaline solutions or suspensions. My invention has additional advantages in that increased amounts of free sulphur are liberated and the consumption of alkali is reduced.

My invention is not limited to the specific instances hereinabove recited by way of example, but is to be construed within the scope of the following claims.

I claim as my invention:

1. The process of purifying a gas from hydrogen sulphide and analogous impurities which comprises washing the gas with an alkaline absorbent liquid containing an iron compound and a lead compound.

2. The process of purifying a gas from hydrogen sulphide and analogous impurities which comprises washing the gas with an alkaline suspension of a compound of a metal the sulphide of which is insoluble therein and containing a lead compound.

3. In a process of purifying a gas from hydrogen sulphide and analogous impurities by means of an alkaline liquid, the step which comprises aerating the alkaline liquid containing hydrogen sulphide absorbed from the gas in the presence of a lead compound.

4. The process of oxidizing metallic sulphides in an alkaline suspension which comprises aerating the suspension in the presence of a lead compound.

5. The process of purifying a gas from hydrogen sulphide which comprises washing the gas with an alkaline solution for absorption of hydrogen sulphide and subsequently regenerating said solution by aeration in the presence of a lead compound.

6. The process of purifying a gas from hydrogen sulphide and analogous impurities which comprises washing the gas with an alkaline suspension of an iron compound, containing also a lead compound.

7. The process of purifying a gas from hydrogen sulphide and analogous impurities which comprises recirculating an alkaline suspension of an iron compound containing also a lead compound over the flowing gas and through an actification stage.

8. A liquid for gas purification which comprises an alkaline liquid containing an iron compound and a lead compound.

9. A liquid for gas purification which comprises an alkaline suspension of a compound of a metal the sulphide of which is normally insoluble in alkaline solution and containing a lead compound.

10. A liquid for gas purification which comprises a suspension of up to 2% of ferric oxide, of from 1 to 3% alkalinity, and containing about 0.5% of a lead compound.

11. The process of purifying gas from hydrogen sulphide which comprises washing the gas with an alkaline liquid containing a material effective to prevent liberation of hydrogen sulphide from the liquid and a lead compound.

In testimony whereof, I have hereunto subscribed my name this 8th day of January, 1927.

DAVID L. JACOBSON.